Feb. 1, 1938.   J. HOSINSKI   2,106,746
GRAIN CLEANER FOR THRESHING MACHINES
Filed July 6, 1936
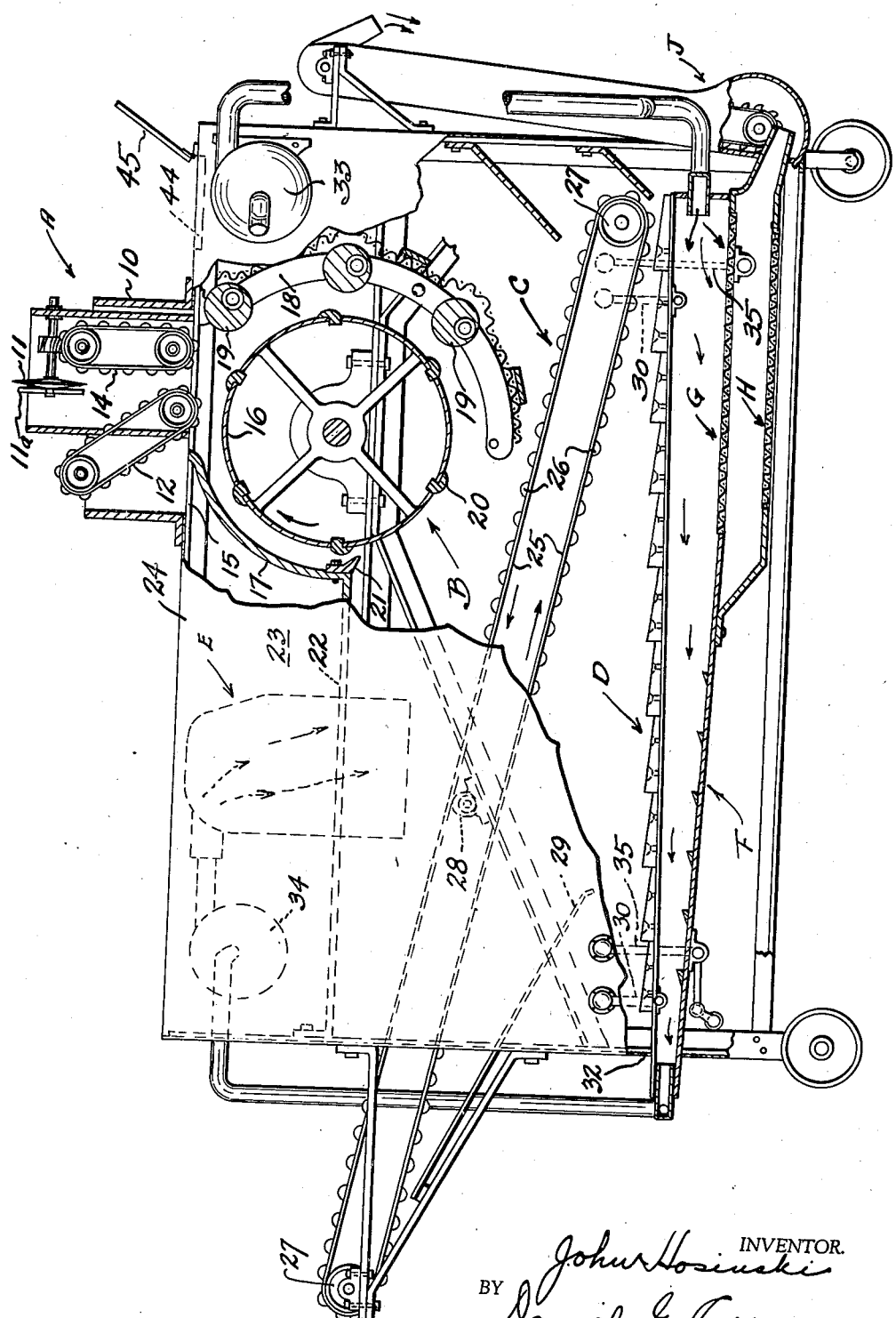
INVENTOR.
John Hosinski
BY Daniel G. Cullen
ATTORNEY.

Patented Feb. 1, 1938

2,106,746

UNITED STATES PATENT OFFICE 2,106,746

GRAIN CLEANER FOR THRESHING MACHINES

John Hosinski, Detroit, Mich.

Application July 6, 1936, Serial No. 88,962

1 Claim. (Cl. 209—318)

This application relates to threshing machines and more particularly aims to provide a complete, well organized, and extremely satisfactory threshing machine, more economical of manufacture than machines now known.

For an understanding of the threshing machine hereof reference should be had to the appended drawing. In this drawing, the figure is a side section of the machine.

The machine in general

The machine in general comprises an open bottom, framed box, mounted on wheels, and having an opening in the top into which cut-open bundles of grain are fed by a feeding means referenced generally A; below the opening and the feeding means and within the box is a beater referenced generally B which beats the fed grain; the beatings drop onto a conveyor sieve referenced generally C; the leavings from sieve C are conveyed out of the box to a suitable receiver, not shown, and the siftings from sieve C fall onto a shaker sieve referenced generally D; the leavings from sieve D are shaken out of the box; the siftings from sieve D drop into a moving stream of air which blows the light parts of such siftings into a bag E and which does not disturb the heavy parts which drop onto a shaking hopper F having a sieve portion G; the leavings on sieve G are shaken out of the box; the siftings from sieve G drop onto a sieve H carried by and movable with sieve G; the leavings on sieve H are shaken into an elevator J; the siftings from sieve H drop onto the ground.

The moving stream of air, passing under shaker D and above hopper F and screen G, is produced by a blower which blows air into the space between shaker D and hopper F and screen G at one end, and by a suction fan, which pulls air out of the space between shaker D and hopper F and screen G at the other end; the blower intake is open to ambient atmosphere; the suction fan outlet opens to the collector bag E.

The feeding means

The feeding means, referenced generally A, includes a bin 10 containing a rotary disk cutter 11 having paddles 11a thereon and oppositely moving feeding and tumbler means 12, 14; a conveyor, not shown, feeds bundles of grain into the bin 10 and the cutter 11 cuts these bundles open and pushes the grain to the feeding tumblers 12 and 14 which agitate the grain so that it is well agitated and loosened before it drops into the beater B below the opening 15 of the box.

The beater

The beater B includes a rotating drum 16 mounted between two semi-shell portions 17—18 secured to the top of the box adjacent the opening 15. On the down side of the rotating drum, and supported by the shell 18, are eccentrically mounted stationary beater bars 19 against which the grain is carried by the rotating drum 16; the ribs 20 of the drum force the grain downwardly in the path between the rotating drum and the shell 18 and its beater bars 19, so that the well beaten grain drops out of the beater and onto the conveyer sieve C.

At the lower edge of the shell 17 is a knife 21, which functions to cut straw which sticks to the drum 16 and scrape such straw off the drum, as the drum rotates in the direction shown in the figure.

The shell 17 cooperates with a plate 22 to form a tool box 23 in the upper portion of the main box 24 of the machine.

The conveyer sieve C

The conveyer sieve C comprises endless belts 25 having thereon a plurality of separated cleats 26; the belts rotate around smooth sheaves 27 so that straw and grain dropped onto the conveyer sieve C from the beater will be moved and well agitated, and for amplifying the movement and agitation of the straw and grain provided by the movement of the conveyer sieve in the direction of the arrow shown in the figure there is mounted adjacent the conveyer a rotary bumper 28 which moves and bumps or vibrates the conveyer. The conveyer operates to convey its leavings from within the box to a point outside of the box from where they may be dropped into a suitable receiver or onto the ground. The spacing of the cleats 26 of the conveyer is such that siftings pass through the conveyer sieve by gravity and fall onto a shaker sieve D.

A suitable slide 29 is mounted adjacent the open part of the box through which the conveyer sieve C passes so that siftings which fall through the conveyer sieve at the forward end of the same will drop upon the slide and slide to the shaker sieve D.

The shaker sieve D

The shaker sieve D is in the nature of a vibrating screen and agitator which functions to vibrate and agitate and sift the siftings from the conveyer sieve C. The shaker D is mounted on suitable shaker hangers 30 and is suitably rocked, as by a crankshaft, not shown.

The leavings on sieve D are shaken out of the box through an opening 32; the siftings from sieve D drop into a moving stream of air below sieve D, produced by a blower fan 33 and a suction fan 34, the latter outletting into the collector bag E. The air stream carries light portions of the siftings from sieve D into the bag E but does not disturb the heavy portions of the siftings from sieve D which drop onto the hopper F, arranged to hang on hangers 35 and to be vibrated, in vibrations counter phased to those of sieve D, by a crankshaft, not shown.

The hopper F has a sifter portion G. Leavings thereon are shaken out of the machine, by hopper F, through the opening 32 or are blown out of the machine, into bag E, by the moving stream of air. Siftings therefrom drop onto a sieve H secured to and carried by and shaken with part F—G; siftings from sieve H drop to the ground through the open bottom of the box; leavings on sieve H are shaken into an elevator J which conveys such leavings, comprising clean grain, into a grain receiver, not shown.

*Details of construction*

Certain details of construction of the threshing machine here disclosed are of importance and these will now be described.

The top of the box is provided with an opening 44 closed by a trap door 45 and disposed adjacent the opening 15 into which cut grain is dropped into the beater. The opening 44 is provided to enable the operator or user of the machine to throw into the box grain that is left on the ground, without requiring that grain to be fed to the box through the feeding means A and without requiring that grain to pass through the beater B.

Moving parts of the machine are equipped with external pulleys and sheaves by means of which all of these parts may be driven from a single drive.

I claim:

A separating machine including two separately and independently mounted and independently operated horizontal shaker sieves, one above the other, and means for sucking air out of the space between them at one end of that space and for blowing that air into a collector bag, and means for blowing air into the space between them at the other end of that space, the upper sieve being substantially horizontal, and the lower sieve being disposed at an acute angle with respect thereto so that the vertical distance between the sieves, near the air blowing means, is larger than the vertical distance between the sieves near the air sucking means, the lower sieve being formed as part of a plate having an imperforate area disposed between the sieve part of the plate and the air sucking means, the machine also having a third sieve, secured to the plate and disposed below the second sieve, and arranged at an acute angle with respect to the first sieve so as to incline down towards the air blowing means end of the machine.

JOHN HOSINSKI.